Aug. 12, 1924. 1,504,450
N. B. HENRY
ART OF FORMING AND WRAPPING OILSEED CAKES
Filed Sept. 9, 1919

INVENTOR.
Nelson B. Henry
BY John Davis
ATTORNEY

Patented Aug. 12, 1924.

1,504,450

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

ART OF FORMING AND WRAPPING OILSEED CAKES.

Application filed September 9, 1919. Serial No. 322,656.

*To all whom it may concern:*

Be it known that I, NELSON B. HENRY, a citizen of the United States, residing at Atlanta, in the county of Fulton and State of Georgia, have invented certain new and useful Improvements in the Art of Forming and Wrapping Oilseed Cakes, of which the following is a specification.

My invention has relation to an improvement in the art of forming and wrapping oil seed cakes prior to the pressing of the oil therefrom and in such connection it relates not only to the steps whereby the cake is formed and wrapped but also to the wrapping or covering for the cake.

Heretofore, the loose cooked meats emerging from the cooker were caught in a cloth, usually camel's hair cloth, which overlapped two ends of the die or receptacle for the cooked meats. When the receptacle was filled, these overlapping ends were brought together to form on the top of the cake a double thickness of cloth. This covering or wrapping of the meats as well as the method of forming the cake were both expensive, laborious and wasteful. Besides no permanent form or shape could be given to the cake so that the cake would fit exactly the interior of the cage or press in which the oil was to be expressed.

By my present invention there is provided a shaping die in which the cooked meats are received and formed into the cake, the base of the die being formed by a cover consisting of a layer of cloth of the exact size of the cake and die and a metallic plate also of the exact size of the cake and die, said plate located below the cloth. The top of the cake while in the die is covered with a similar combined cloth and metal covering.

After the meats and plates are assembled in the forming die, pressure is applied, sufficient to compact the meats and cause the coverings to unite with the surface of the meats, and the formed cake is expelled from the die.

In the preferred form of cover for the cake, the cloth is united at one edge to the metal plate, and said plate is suitably grooved and cross grooved and perforated to collect and lead away the oil exuding from the cake under pressure.

The nature and scope of my invention will be more fully understood from the following description, taken in connection with the accompanying drawings, forming part hereof, in which—

Figure 1:
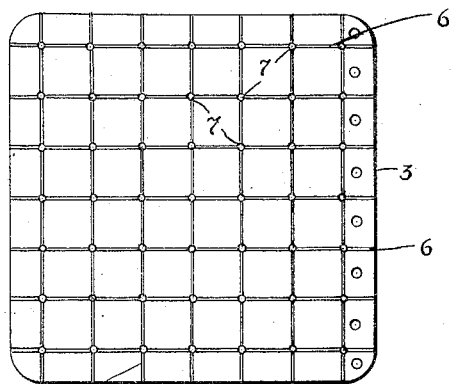
Figure 1 is a top or plan view of one of the grooved and perforated metallic plates forming part of a cover for the cake.

Referring to the drawings, 1 represents a die the interior of which is shaped to conform with the shape and depth of the cake required. The corners of the interior of the die are preferably rounded so that the meats as received are closely packed in and fit all interior surfaces of the die.

The base of the die is formed by a removable plate 3 on which is supported a layer of fabric 4 usually camel's hair cloth. The plate 3 and cloth 4 are cut or shaped to closely fit the interior of the die. When sufficient meats are packed in the die 1, a covering, consisting of a plate 3 and layer of fabric 4 interposed between plate 3 and cake 5, is placed on top of the cake.

Figure 2:
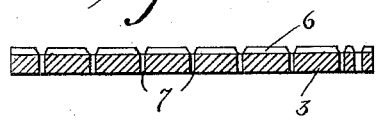
Figure 2 is a cross sectional view of the same.
Figure 4:
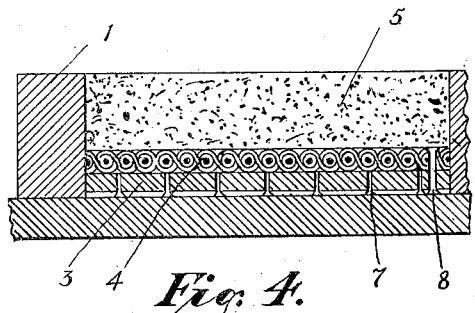
Figure 4 is a cross sectional view of the cake forming die and of the cover arranged with the cake in said die.
Figure 3:
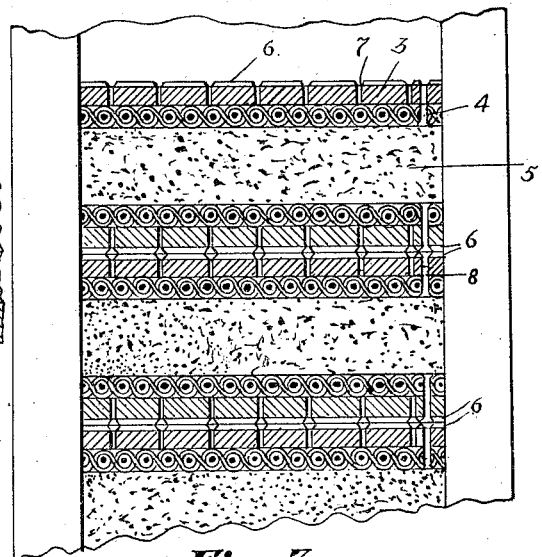
Figure 3 is a cross sectional view of a plurality of cakes each enclosed between covers embodying my invention, and the cakes arranged within a cage or press chamber

The plate 3 (see Figures 1 and 2) has one of its surfaces grooved longitudinally and transversely as at 6 to form narrow oil conducting channels. At the crossing of the channels thus formed, a series of vertical perforations or apertures 7 are formed, so that the oil from the cake may traverse the upper and lower plates enclosing the cake. In the assembling of the cakes in the press cage, the grooves of an upper plate 3 meet and register with the grooves of an adjacent lower plate to form a continuous double channel terminating respectively at either end and either side of the cake.

The cloth 4 is united at one edge to an edge of a plate 3 by suitable fastenings 8 usually short rivets. By means of this construction the cloth may be readily stripped from an expressed cake by lifting plate 3 and pulling at one end upon an edge of the cloth.

Having thus described the nature and ob- jects of my invention, what I claim as new and desire to secure by Letters Patent, is—

1. The improvement in the art of extracting oil from oil bearing vegetable material, which consists in enclosing each charge of material within a shaping die, between a pair of metallic plates; applying compacting pressure separately to each charge placed in the die to preform the same and form a metal surfaced cake and successively removing each metal covered formed cake from the die to an oil extracting press, as and for the purpose described.

2. The improvement in the art of extracting oil from oil bearing material which consists in enclosing each charge of material within a shaping die, between a pair of fabric sheets and a pair of metallic plates outside the fabric sheets; applying compacting pressure separately to each charge placed in the die to preform the same and form a metal surfaced cake and successively removing each metal covered formed cake from the die to an oil extracting press, as and for the purpose described.

In testimony whereof I have signed my name to this specification.

NELSON B. HENRY.